Jan 6, 1931. W. R. SMITH 1,787,766
TRANSMISSION SHIFTING MECHANISM
Filed Nov. 23, 1927 2 Sheets-Sheet 1
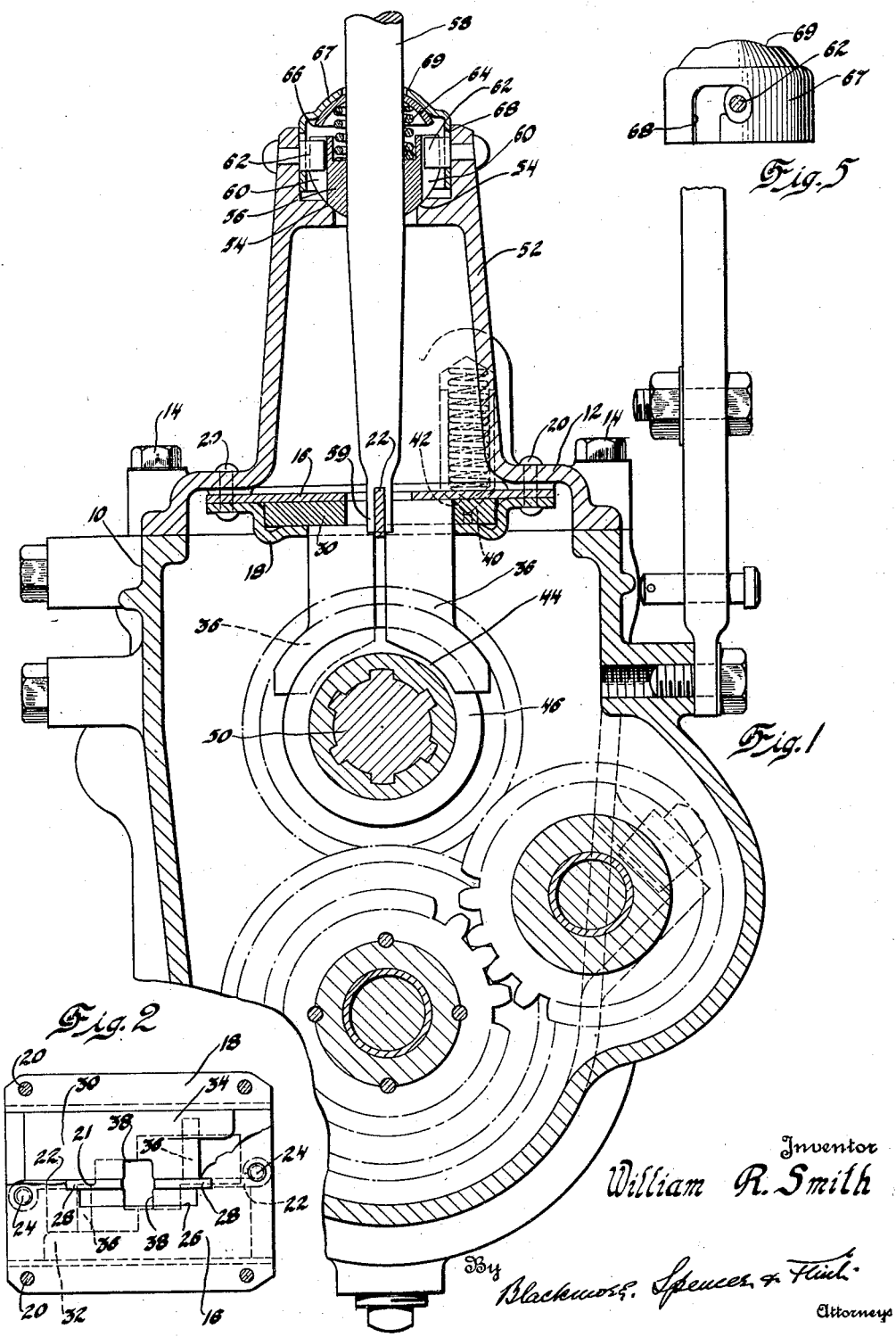

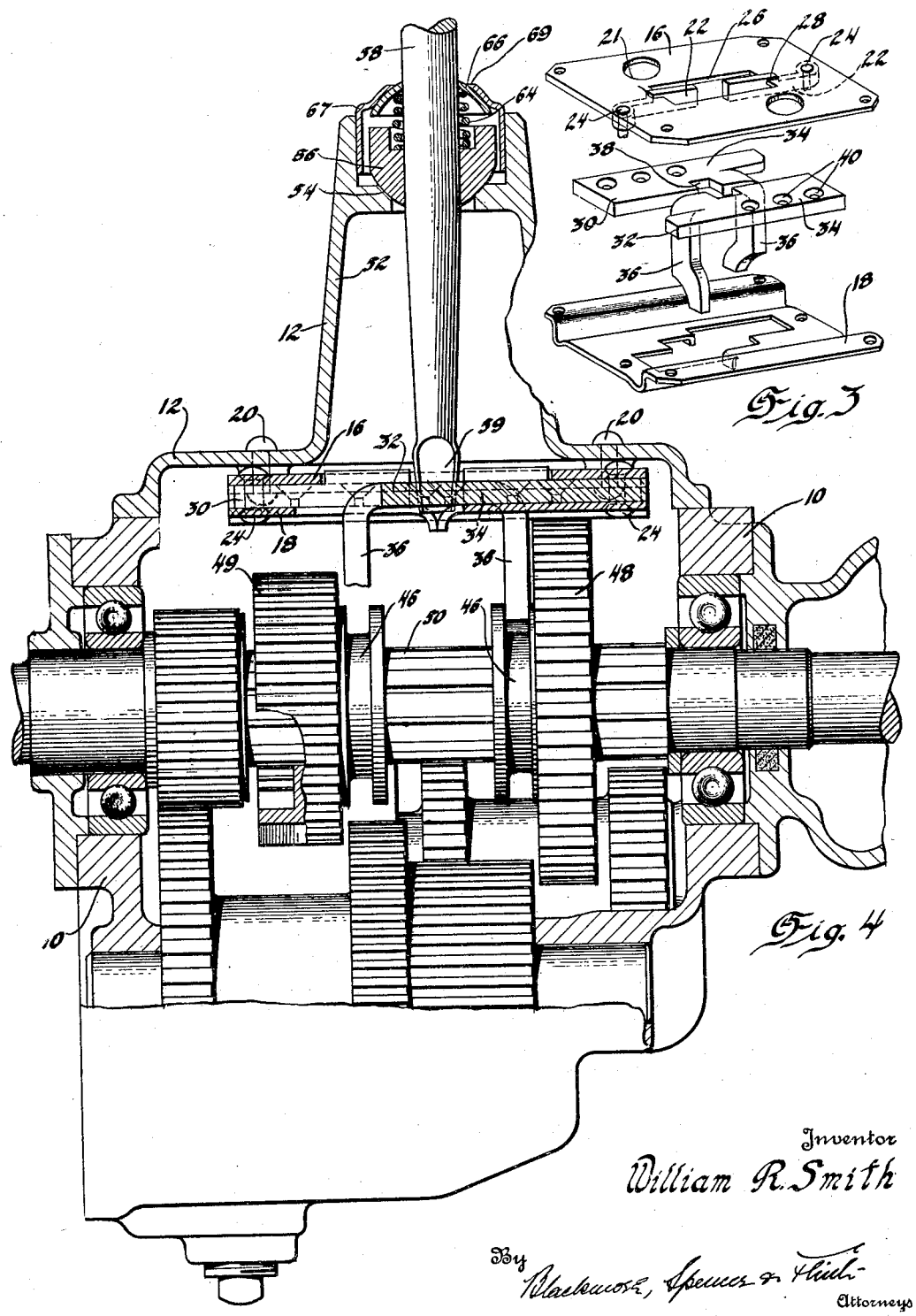

Patented Jan. 6, 1931

1,787,766

UNITED STATES PATENT OFFICE

WILLIAM R. SMITH, OF TOLEDO, OHIO, ASSIGNOR TO GENERAL MOTORS CORPORATION, OF DETROIT, MICHIGAN, A CORPORATION OF DELAWARE

TRANSMISSION-SHIFTING MECHANISM

Application filed November 23, 1927. Serial No. 235,249.

This invention relates to change speed transmission mechanism for motor vehicles and has particularly to do with the cover for the transmission casing which carries the shifting mechanism.

It is an object of this invention to provide a new and improved gear shifting means supported solely on the under side of the cover of the transmission casing. More specifically, it is an object of this invention to provide such a structure which is made from stamped instead of cast metal, and which can be more economically manufactured than the gear shifting mechanisms now in use. It is a further object of the invention to provide such a structure which can be readily assembled and disassembled.

Other objects and advantages of the invention will appear in the course of the following description, taken in connection with the accompanying drawing and appended claims:

In the drawing:

Figure 1 is a vertical transverse section through a transmission casing and gear shift mechanism embodying my invention.

Figure 2 is a plan view of the gear shift mechanism alone.

Figure 3 is a view showing the gear shifting mechanism disassembled.

Figure 4 is a vertical longitudinal section through the transmission and gear shift mechanisms.

Figure 5 is a side view of the cap for the gear shift lever support.

Referring to the drawing, I have illustrated in Figure 1 a transmission box or casing 10 which is provided with a cover 12 fixed thereto by means of bolts 14. On the under side of the cover are top and bottom plates 16 and 18, respectively, fixed together and to the cover by means of rivets 20. Between the plates 16 and 18 are the dividers 22, which are pressed to form openings on the non-adjacent ends through which extend rivets 24 which anchor the dividers to the plates 16 and 18. The top plate 16 is provided with a large rectangular central slot 26 provided with small opposed end slots 28 within which fit the shoulders 21 of the respective dividers 22.

Between the plates 16 and 18 are the shifter forks 30 and 32, one of these being provided on each side of the dividers 22. Each fork is slidable longitudinally of the plates, by means described in detail below. Each fork, as shown in Figure 3, comprises a horizontal portion 34, and a depending arm or gear shifting portion 36. The horizontal portions are provided, on the sides adjacent the dividers, each with a slot 38 the length of which is substantially the distance between the adjacent ends of the dividers 22. On the upper sides of the horizontal portions 34 are three longitudinally arranged substantially cone-shaped depressions 40, each of these being adapted to receive the lower end of a cone-shaped spring pressed plunger 42 mounted in the cover 12. The arms 36 are shaped to provide arcuate edges 44 adapted to fit in the annular grooves 46 of gears 48, 49 splined on the shaft 50 to thereby shift the gears.

The cover 12 is shaped in its central portion to provide a hollow conical portion or dome 52 in the upper portion of which is provided with spherical segmental surface 54 for the correspondingly shaped ball 56 fixed to an intermediate part of the gear shift lever 58. The ball 56 is provided on opposite sides with vertical slots 60 into each of which fits a pin 62 fixed in the side of the dome 52. A coil spring 64 surrounds the lever 58 and is held compressed by the spherical cap 66 fitting within the cover 67, the cylindrical portion of which is provided with bayonet slots 68 cooperating with the pins 62. The cover 67 is provided with an aperture 69 for permitting limited universal movement of the lever 58.

The operation of the device will now be described. When the gear shift lever is in neutral the lower end 59 of the lever 58 will be between the dividers 22. The shifter forks will hold the respective gears in neutral and will themselves be resiliently held in neutral by the spring-pressed plungers 42 fitting in the central one of the depressions 40. When it is desired to shift gears, the lever 58 is moved to one side until its lower end clears the dividers 22 and fits into one of the slots 38, in which position the lever 58 may be moved either forward or rearward to move the shifter fork forward or rearward. In either its forward or rearward position the shifter fork is resiliently held in position by a spring-pressed plunger 42 fitting in the end depression 40.

I claim:

1. In a device of the class described, a cover having a gear shift lever pivotally mounted thereon, a removable plate fixed to the under side of said cover, a divider extending longitudinally of said plate and cover and provided with a central slot, a shifter fork mounted on each side of the divider between said plate and cover for independent longitudinal movement, each fork being provided with a slot on its inner side.

2. In a device of the class described, a cover having a gear shift lever pivotally mounted thereon, spaced superimposed plates fixed to the under side of said cover, a longitudinally extending divider between said plates having a central slot therein, a shifter fork mounted on each side of the divider between said plates and slidable independently longitudinally thereof, each shifter fork being provided with a slot on its inner side.

3. In a device of the class described, a cover having a gear shift lever pivotally mounted thereon, superimposed spaced plates fixed to the under side of said cover, a vertically disposed divider fixed between said plates and provided with a central slot, a shifter fork on each side of the divider between said plates and independently slidable longitudinally thereof, each fork being provided with a slot on its inner side.

4. In a device of the class described, a cover provided with a gear shift lever pivotally mounted thereon, superimposed spaced plates fixed to the under side of said cover, one of said plates being provided with opposed slots, vertically disposed dividers fixed between said plates, each having a portion extending in one of said slots, said dividers being separated to provide a space therebetween, a shifter fork on each side of the dividers and slidable independently longitudinally thereof, each fork being provided with a slot on its side adjacent the dividers.

In testimony whereof I affix my signature.

WILLIAM R. SMITH.